Oct. 25, 1955 H. L. HOKE 2,721,582
PIPE CLAMP
Filed Aug. 28, 1951 3 Sheets-Sheet 1

INVENTOR.
HOWARD L. HOKE
BY Robert E. Burns
ATTORNEY.

Oct. 25, 1955
H. L. HOKE
2,721,582
PIPE CLAMP
Filed Aug. 28, 1951
3 Sheets-Sheet 2
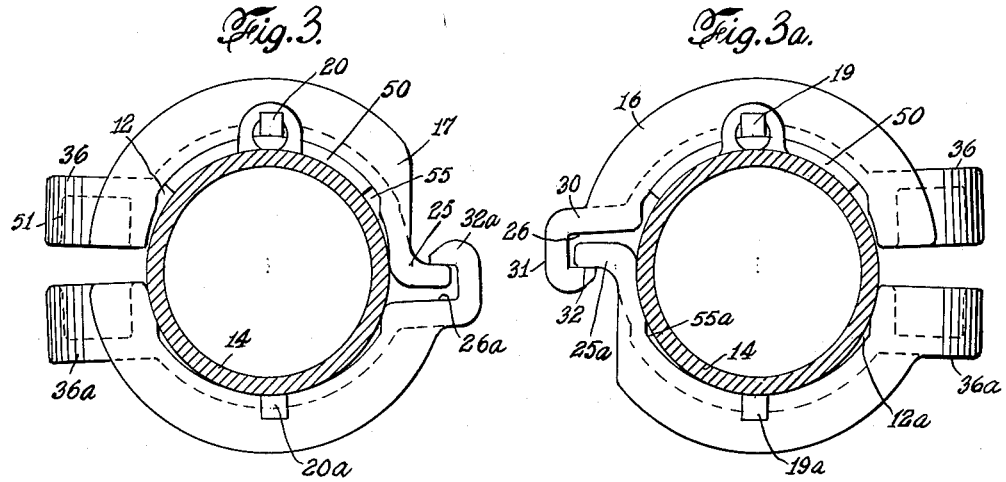
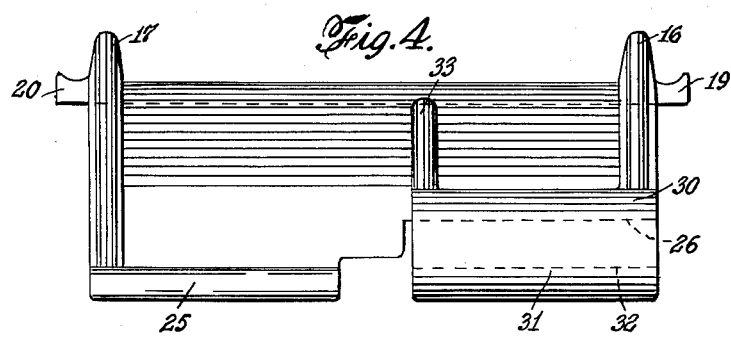
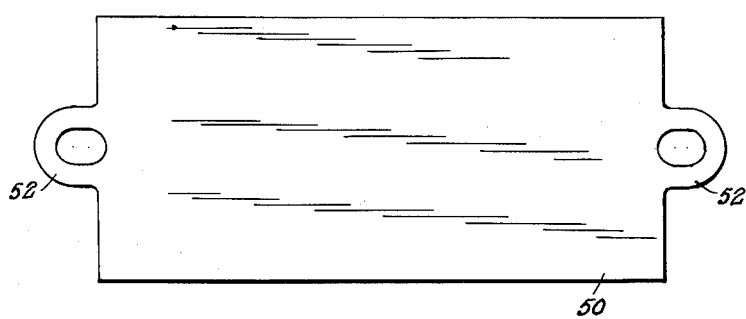
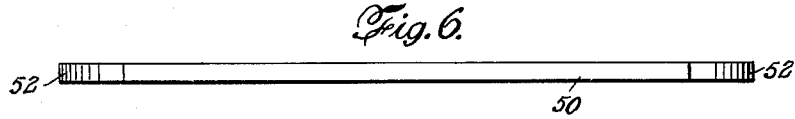
INVENTOR.
HOWARD L. HOKE
BY
ATTORNEY.

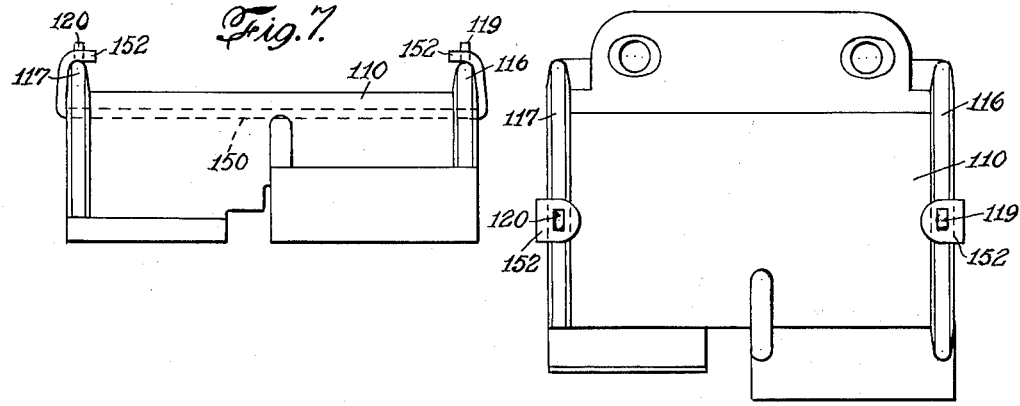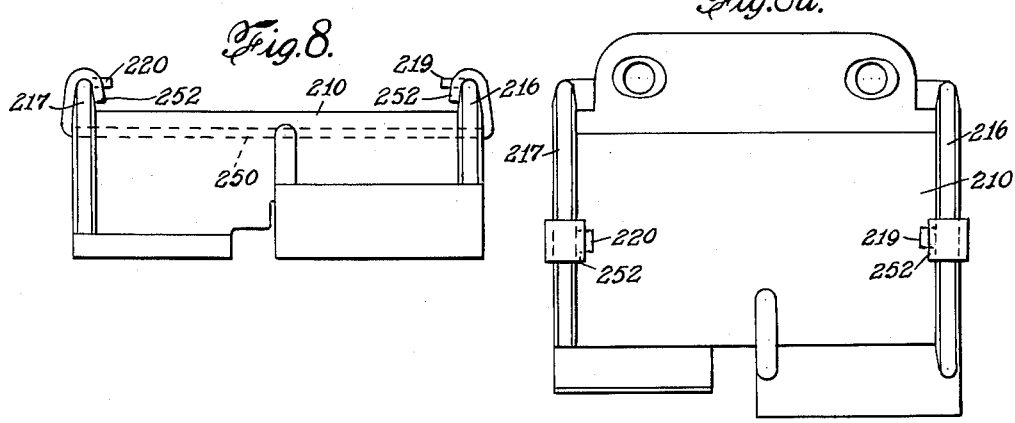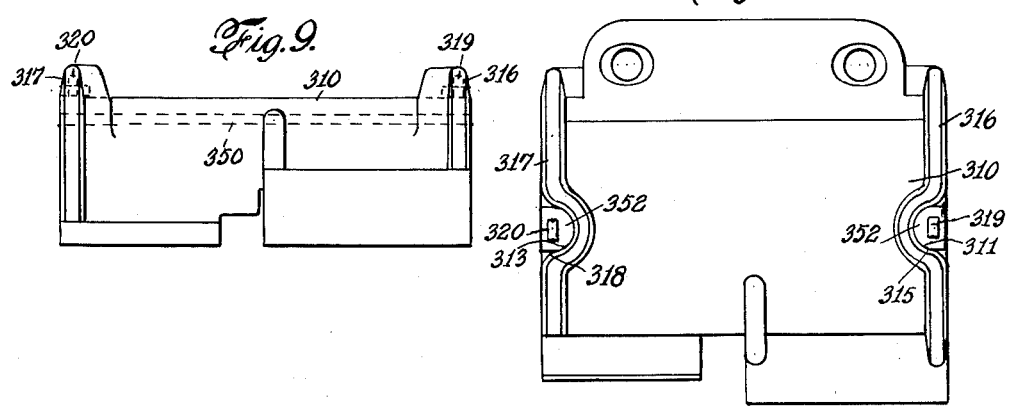

United States Patent Office 2,721,582
Patented Oct. 25, 1955

2,721,582

PIPE CLAMP

Howard L. Hoke, Bradford, Pa., assignor to Dresser Industries, Inc., Dallas, Tex., a corporation of Pennsylvania Application August 28, 1951, Serial No. 243,999

9 Claims. (Cl. 138—99)

This application relates to a leak repair clamp for application to a pipe to effect emergency repair of leaks in the pipe, and is more particularly concerned with a leak repair clamp of the character indicated which has an improved structure.

In the maintenance of pipe lines, e. g. local lines for the transmission of gas, water, steam, or the like, or long-distance lines for the transmission of oil, water and gas, leaks caused by cracks or punctures in the pipe are repaired, at least temporarily, by the application to the pipe of a leak repair clamp. A leak repair clamp comprises essentially a body portion having a leak sealing gasket means for application over the damaged section of the pipe and a clamping portion for drawing the body portion against the pipe to compress the gasket into fluid-sealing relationship.

Various types of repair clamps of this character have been proposed and used, and while these clamps have been relatively effective in service, they have for the most part involved a construction which is not adapted to be packed and shipped as an integral unit ready for direct application to the pipe, and have included a gasket portion which can easily become separated from the clamp body portion and thus cause delays in application of the clamp. These heretofore known types of leak repair clamps have generally required preparatory assembly and have required relatively skilled labor for proper installation. In view of the fact that it is particularly desirable to close a pipe leak as promptly as possible, since the escape of gas or liquid is not only wasteful but sometimes hazardous, it is highly advantageous to have available an efficient clamp which is assembled and shipped as an integral unit ready for direct application and which can be installed rapidly and easily.

It is the principal object of the present invention to provide an improved leak repair clamp for pipes in which the component parts are assembled in self-sustaining relationship and which is adapted to be transported and stored as an integral unit, ready for direct installation without need for preparatory assembly of component parts.

It is a further object of the invention to provide a pipe leak repair clamp of improved and simplified construction.

It is another object of the invention to provide a repair clamp of the character indicated having a gasket member which is readily assembled with the body portion at the time of manufacture and interlocked therewith.

It is another object of the invention to provide a repair clamp gasket of improved advantageous construction.

In accordance with the invention, I provide a pipe leak repair clamp comprising a body portion shaped to define an arcuate inner face adapted to conform substantially to the curvature of the pipe upon which the clamp is to be installed, a gasket member carried by the body portion and extending across the arcuate inner face, and a clamping portion constructed to surround a portion of the pipe and be drawn toward the body portion to compress the gasket into leak sealing engagement with the damaged surface of the pipe.

It is a feature of the invention that the gasket is removably attached to the body portion or to the clamp portion so that it may be assembled therewith at the time of manufacture and will remain with the clamp during shipment and storage and will thus be in position for immediate installation, but may be removed from the body portion or clamp portion if desired. In the preferred form of my invention the gasket is provided with end loops which are received by ears or lugs formed integrally with the body portion.

It is another feature of the invention that the body portion and the clamping portion of my pipe leak repair clamp are identical in structure and are constructed with complementary engaging members so that they are hingedly engageable with one another at one side and the two cooperating portions may be drawn together by means of bolts to compress the gasket.

Other objects and features of my invention will be readily apparent from the following detailed description of an illustrative embodiment thereof and from the accompanying drawings, wherein, Fig. 1 is a side elevation of a pipe leak repair clamp embodying features of the present invention;

Fig. 3 and Fig. 3a are end elevations of the clamp shown in Figs. 1 and 2 before application of the bolts;

Fig. 4 is a side elevation of the hinged side of the body portion of my clamp showing the arrangement for hinged connection with a clamping portion of identical construction;

Fig. 5 is a plan view of the gasket adapted to be used with the clamp shown in Figs. 1, 2 and 3;

Fig. 6 is a side elevation of the gasket shown in Fig. 5;

Fig. 7 is an elevational view showing a clamp body having a modified gasket-retaining structure;

Fig. 7a is a plan view of the embodiment of Fig. 7;

Fig. 8 is an elevational view showing another modified form of gasket-retaining structure;

Fig. 8a is a plan view of the arrangement shown in Fig. 8;

Fig. 9 is an elevational view showing a further modified form of gasket-retaining structure, and Fig. 9a is a plan view of the embodiment of Fig. 9.

Figure 1:
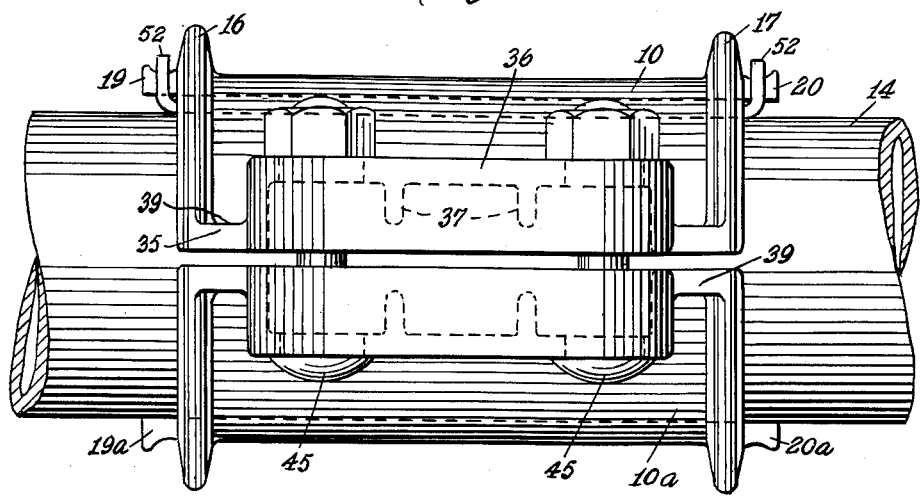
Figure 2:
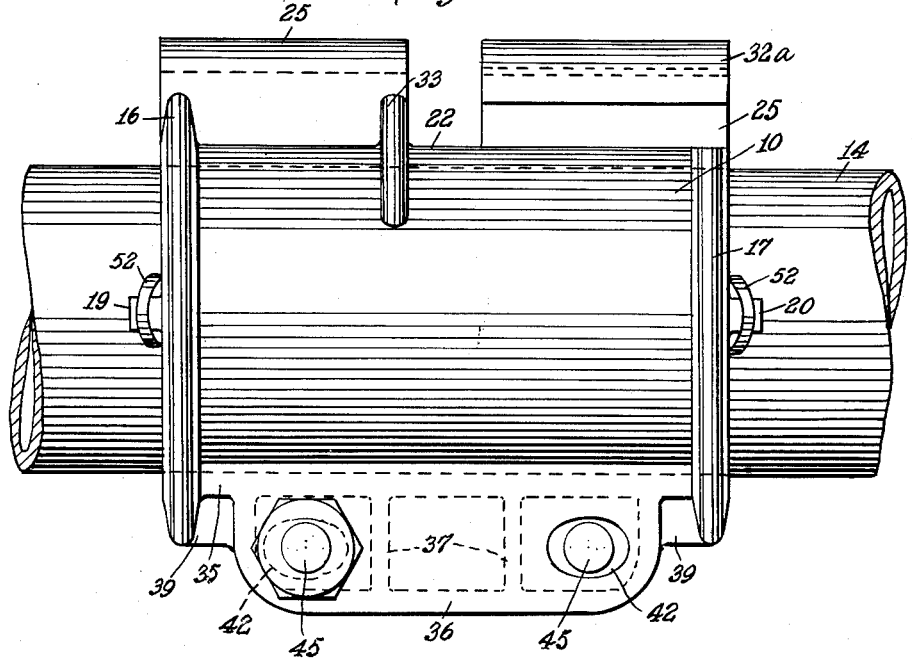
Fig. 2 is a plan view of the repair clamp shown in Fig. 1.

Referring to the drawings, and particularly to Figs. 1, 2 and 3, the body portion and the clamping portion of my repair clamp are designated by the reference numerals 10 and 10a, respectively, and are advantageously formed from steel, castiron or other metal. The body portion 10 is of semi-cylindrical form and has an inner arcuate face 12 conforming substantially in curvature with the curvature of the outside surface of the pipe 14 upon which the clamp is mounted. Exteriorly, the ends of the body portion 10 are provided with radial strengthening rib 16 and 17, and with axially projecting ears or lugs 19 and 20, which, as will be described below, serve to retain the gasket in assembled position with the remainder of the clamp. To insure the necessary engagement with the clamping portion 10a for drawing the two portions of the clamp together to compress the gasket, one longitudinal edge of the body portion 10 is provided with hinge locking means. Thus, referring particularly to Figs. 2 and 4, the edge 22 is formed along a portion of its length with an outwardly-extending radial tongue 25 and the opposite end of edge 22 is formed with a structure defining a groove 26 adapted to receive the tongue of the corresponding clamping portion. The groove-defining structure comprises a radial extension 30, a vertical portion 31 and an inwardly-directed hook portion 32. The inner edge of radial extension 30 is reinforced by a rib 33. The opposite edge 35 of body portion 10 is provided with a flange portion 36 having strengthening ribs 37 integral with body portion 10 and end ribs 39 which merge with radial ribs 16 and 17 along edge 35. Flange portion 36 is formed with two apertures 42 for receiving the bolts 45.

As previously mentioned, it is a feature of my pipe leak repair clamp that the body portion and the clamping portion are of identical construction, thus greatly simplifying manufacture. In the drawings the various parts of clamping portion 10a are identified with the reference numerals used to identify corresponding parts of body portion 10, with the addition of the letter a. Thus, the clamping portion 10a is formed with a tongue 25a, a groove 26a, a hook portion 32a, a flange portion 36a, ears 19a and 20a, and an arcuate inner face 12a.

In addition to the above-described body portion 10 and clamping portion 10a, the repair clamp of the invention is characterized by a removably-attached resilient gasket adapted to be placed over the damaged portion of the pipe and to be compressed into fluid-sealing relationship with the pipe surface. Referring to Figs. 5 and 6, the gasket in the preferred form illustrated comprises a substantially rectangular sheet 50 formed with loops 52 at each longitudinal end. The gasket sheet 50 is formed from rubber or rubber composition, this term being used generically to include natural and synthetic rubbers and elastomeric compounds, or compositions having like properties and characteristics. Advantageously, gasket sheet 50 is formed from a rubber composition which is relatively resistant to attack by hydrocarbon gases and oils. Examples of such resistant rubbery compositions suitable for use with my leak repair clamp are Neoprene (polychloroprene) and butadiene-acrylonitrile co-polymers, such as those known commercially by the trade designations Buna-N or GR-A. My invention is not, however, limited to these specific materials, and gasket materials such as lead, plastic, cork, cloth, paper, felt and any rubbery compressible elastic composition having the above-noted characteristics may be employed.

The gasket sheet 50 is suitably dimensioned to be received in the body portion 10 and to extend between the ends of the arcuate face 12 with the loops 52 engaged and held by the ears 19 and 20. The gasket sheet 50 is thus held in place but if desired it may be removed by disengaging the loops 52 from the ears 19 and 20. Similarly, if desired, the gasket sheet 50 may be attached to the clamping portion 10a with the loops 52 in engagement with the ears 19a and 20a. It will also be apparent that my pipe leak repair clamp may be provided with two gasket sheets 50, one attached to the body portion 10 and the other attached to the clamping portion 10a. It will be noted by reference to Fig. 3 that the arcuate face 12 is formed with a lightly recessed portion 55 in which the gasket sheet 50 is conveniently seated. The arcuate face 12a of clamping portion 10a is similarly formed with a recessed portion 55a.

It will be obvious that my improved pipe leak repair clamp may be provided in sizes to fit the various sizes of commercial pipe with which it may be advantageously used, and while my repair clamp is suitable for use with a wide variety of pipe sizes, it is especially suitable for use with standard pipe sizes of ½ inch to 24 inches. It is known that in practice pipes vary to some extent from what may be termed the "nominal" external diameter, some being of slightly greater diameter and others being of somewhat lesser diameter, i. e. varying from what may be termed "maximum" pipe to what may be termed "minimum" pipe. The body portion 10 and the clamping portion 10a are accordingly formed to accommodate the maximum over-sized pipe of any nominal size.

When the repair clamp is assembled at the time of manufacture, the identical body portion 10 and clamping portion 10a are interlocked by slipping the tongue 25 of body portion 10 into the groove 26a of the clamping portion 10a and slipping the tongue 25a of the clamping portion 10a into the groove 26 of the body portion 10a. The gasket sheet 50 is placed in position in the clamp with the loops 52 in engagement with the ears 19 and 20, the bolts 45 are positioned in the flanges 36 and 36a and the repair clamp is ready for shipment. The parts remain together in self-sustaining relationship during shipment and storage and are at all times ready for immediate use without requiring any further assembly.

To apply my pipe leak repair clamp it is merely necessary to place it around the portion of the damaged pipe to be sealed and then to tighten the bolts 45. Tightening of bolts 45 draws body portion 10 and clamping portion 10a together and compresses the gasket sheet 50 into fluid-tight sealing engagement with the surface of the pipe 14, effectively sealing and closing the damaged portion and permitting continued use of the pipe.

It will be apparent that my leak repair clamp may be formed with gasket-retaining means other than the ears 19 and 20 specifically shown in the embodiment of Fig. 1. Other structural arrangements for removably retaining the gasket 50 in position are shown by way of example in Figs. 7, 7a, 8, 8a, 9 and 9a. Thus, referring specifically to Figs. 7 and 7a, wherein parts corresponding to those shown in Fig. 1 have been given similar reference numbers to which 100 has been added, the ribs 116 and 117 of the body portion 110 are provided with radially-extending projections or ears 119 and 120, respectively. The gasket 150 is so dimensioned that its end loops 152 may be positioned in retaining engagement with the ears 119 and 120. In cases where it is desired not to increase the axial length of the leak repair clamp any more than necessary, this form of gasket-retaining arrangement is advantageous.

In Figs. 8 and 8a is shown a gasket-retaining arrangement which does not increase either the axial length or the radial width of the clamp. Thus, as shown in these figures, wherein parts corresponding to those shown in Fig. 1 have been given similar reference numbers to which 200 has been added, the ribs 216 and 217 of clamp body portion 210 are provided with inwardly directed ears 219 and 220, respectively. These ears receive the end loops 252 of the gasket 250.

In Figs. 9 and 9a is shown an arrangement which is particularly advantageous not only in avoiding an increase in the length and width of the clamp but also in protecting the gasket from accidental damage during shipment and use. In Figs. 9 and 9a parts corresponding to those shown in Fig. 1 have been given similar reference numbers to which 300 has been added. Centrally of the clamp body portion 310, the ribs 316 and 317 are curved inwardly of the clamp body to define substantially semi-circular recesses 311 and 313, respectively, and the sides of clamp body 310 are formed with rectangular axial recesses 315 and 318 adjacent rib recesses 311 and 313, respectively. The recesses 315 and 318 are dimensioned to accommodate the end loops 352 of gasket 350. Extending upwardly from the clamp body 310 in the recesses 311 and 313 are studs or pins 319 and 320, respectively. The studs 319 and 320 receive the end loops 352 of the gasket 350 in such manner that, as shown in Figs. 9 and 9a, the exposed portion of the gasket lies wholly within the end faces of the body 310.

While I have thus described and shown illustrative embodiments of my invention, it will be obvious to those skilled in the art that various other changes and modifications may be made in this embodiment without departing from the invention as defined in the appended claims, and it is intended, therefore, that all matter contained in the foregoing description and in the drawings shall be interpreted as illustrative and not in a limiting sense.

What I claim and desire to secure by Letters Patent is:
1. A pipe leak repair clamp for application to a damaged pipe to seal the damaged portion thereof, comprising, in combination, a body portion having an arcuate inner face adapted to conform substantially to the curvature of the pipe, a gasket member engageable with and removably carried by said body portion and extending across the said arcuate inner face, a clamping portion engageable with the said body portion to surround the pipe, and means for drawing said body portion and said clamping portion together around the pipe to compress said gasket member into leak sealing engagement with the surface of the pipe, one axial edge of said body portion being formed along substantially half its length with an outwardly projecting radial tongue and along the other half of its length with an axially-extending radial groove.

2. A pipe leak repair clamp for application to a damaged pipe to seal the damaged portion thereof, comprising, in combination, a body portion having an arcuate inner face adapted to conform substantially to the curvature of the pipe, a gasket member removably carried by said body portion and extending across the said arcuate inner face, a clamping portion engageable with the said body portion to surround the pipe, and means for drawing said body portion and said clamping portion together around the pipe to compress said gasket member into leak sealing engagement with the surface of the pipe, said body portion and said clamping portion being each provided along one axial edge with an outwardly-projecting radial tongue extending substantially one-half the length of said edge and with an axially-extending radial groove, the tongue and the groove of the body portion mutually interengaging with the corresponding parts of the clamping portion.

3. A pipe leak repair clamp for application to a damaged pipe to seal the damaged portion thereof, comprising, in combination, a body portion having an arcuate inner face adapted to conform substantially to the curvature of the pipe and having axially-extending ears projecting from its end edges, a gasket member removably carried by said body portion and extending across the said arcuate inner face and having ends engageable with said ears, a clamping portion engageable with the said body portion to surround the pipe, and means for drawing said body portion and said clamping portion together around the pipe to compress said gasket member into leak sealing engagement with the surface of the pipe, said body portion and said clamping portion being provided along one axial edge with an outwardly-projecting radial tongue extending substantially one-half the length of said edge and with an axially-extending radial groove, the tongue and the groove of the body portion mutually interengaging with the corresponding parts of the clamping portion.

4. A pipe leak repair clamp for application to a damaged pipe to seal the damaged portion thereof, comprising, in combination, a body portion having an arcuate inner face adapted to conform substantially to the curvature of the pipe, a gasket member engageable with and removably carried by said body portion and extending across the said arcuate inner face, a clamping portion engageable with the said body portion to surround the pipe, and bolt means for drawing said body portion and said clamping portion together around the pipe to compress said gasket member into leak sealing engagement with the surface of the pipe, one axial edge of said body portion being formed along substantially half its length with an outwardly projecting radial tongue and along the other half of its length with an axially-extending radial groove, the other axial edge of said body portion being provided with apertures for receiving said bolt means.

5. A pipe leak repair clamp for application to a damaged pipe to seal the damaged portion thereof, comprising, in combination, a body portion having an arcuate inner face adapted to conform substantially to the curvature of the pipe and having axially-extending ears projecting from its end edges, a gasket member removably carried by said body portion and extending across the said arcuate inner face and having ends engageable with said ears, a clamping portion engageable with the said body portion to surround the pipe, and bolt means for drawing said body portion and said clamping portion together around the pipe to compress said gasket member into leak sealing engagement with the surface of the pipe, said body portion and said clamping portion being provided along one axial edge with an outwardly-projecting tongue extending substantially one-half the length of said edge and with an axially-extending groove, the other axial edge of said body portion and said clamping portion being provided with apertures for receiving said bolt means.

6. In a pipe line, a pipe section having a damaged portion in its wall, and a repair clamp enclosing the damaged portion, said clamp comprising a body portion having an arcuate inner face conforming substantially to the curvature of the pipe section, a gasket member engageable with and removably carried by said body portion and extending across the said arcuate inner face, a clamping portion engageable with the said body portion to surround the pipe, and means for drawing said body portion and said clamping portion together around the pipe to compress said gasket member into leak sealing engagement with the surface of the pipe, said body portion and said clamping portion being provided along one axial edge with an outwardly-projecting radial tongue extending substantially one-half the length of said edge and with an axially-extending radial groove, the tongue and the groove of the body portion mutually interengaging with the corresponding parts of the clamping portion.

7. In a pipe line, a pipe section having a damaged portion in its wall, and a repair clamp enclosing the damaged portion, said clamp comprising a body portion having an arcuate inner face conforming substantially to the curvature of the pipe section, and having axially-extending ears projecting from its end edges, a gasket member removably carried by said body portion and extending across the said arcuate inner face and having ends engageable with said ears, a clamping portion engageable with the said body portion to surround the pipe section, and bolt means for drawing said body portion and said clamping portion together around the pipe section to compress said gasket member into leak sealing engagement with the surface of the pipe section, said body portion and said clamping portion being provided along one axial edge with an outwardly-projecting tongue extending substantially one-half the length of said edge and with an axially-extending groove, the other axial edge of said body portion and said clamping portion being provided with apertures for receiving said bolt means.

8. A pipe leak repair clamp for application to a damaged pipe to seal the damaged portion thereof, comprising, in combination, a body portion having an arcuate inner face adapted to conform substantially to the curvature of the pipe, a gasket member engageable with and removably carried by said body portion and extending across the said arcuate inner face, a clamping portion engageable with the said body portion to surround the pipe, and bolt means for drawing said body portion and said clamping portion together around the pipe to compress said gasket member into leak sealing engagement with the surface of the pipe, said body portion and said clamping portion being provided along one axial edge with an outwardly-projecting tongue extending substantially one-half the length of said edge and with an axially-extending groove, the other axial edge of said body portion and said clamping portion being provided with apertures for receiving said bolt means.

9. A pipe leak repair clamp for application to a damaged pipe to seal the damaged portion thereof, comprising, in combination, a body portion having an arcuate inner face adapted to conform substantially to the curvature of the pipe, a gasket member engageable with and removably carried by said body portion and extending across the said arcuate inner face, a clamping portion engageable with the said body portion to surround the pipe, and means for drawing said body portion and said clamping portion together around the pipe to compress said gasket member into leak sealing engagement with the surface of the pipe, one axial edge of said body portion being formed along substantially half its length with an outwardly projecting radial tongue and along the other half of its length with an axially-extending radial groove, said body portion and said clamping portion being substantially identical in construction.

References Cited in the file of this patent

UNITED STATES PATENTS

| | | |
|---|---|---|
| 799,623 | Augensen | Sept. 19, 1905 |
| 895,143 | Augensen | Aug. 4, 1908 |
| 1,618,234 | Skinner | Feb. 22, 1927 |
| 2,193,426 | Lazarides | Mar. 10, 1940 |

FOREIGN PATENTS

| | | |
|---|---|---|
| 315,247 | Great Britain | July 10, 1929 |